US006156976A

United States Patent [19]

Kawamura et al.

[11] Patent Number: 6,156,976

[45] Date of Patent: *Dec. 5, 2000

[54] PROTECTIVE CONSTRUCTION FOR SPLICE PORTION

[75] Inventors: Shigeto Kawamura; Atsushi Fujisawa, both of Yokkaichi, Japan

[73] Assignee: Sumitomo Wiring Systems, Ltd., Yokkaichi, Japan

[ * ] Notice: Under 35 U.S.C. 154(b), the term of this patent shall be extended for 568 days.

[21] Appl. No.: 08/518,997

[22] Filed: Aug. 24, 1995

[30] Foreign Application Priority Data

Oct. 31, 1994 [JP] Japan .................................... 6-267673

[51] Int. Cl.[7] .................................................... H02G 15/04

[52] U.S. Cl. ............................................................... 174/76

[58] Field of Search ............................... 174/74 A, 74 R, 174/76, 77 R, 87, 82

[56] References Cited

U.S. PATENT DOCUMENTS

| | | | |
|---|---|---|---|
| 3,585,275 | 6/1971 | Gillemot | 174/76 |
| 3,597,528 | 8/1971 | Penfield et al. | 174/87 |
| 3,914,002 | 10/1975 | Berliner et al. | 339/16 R X |
| 4,647,717 | 3/1987 | Uken | 174/84 C X |
| 4,662,514 | 5/1987 | Berbeco | 206/328 X |
| 5,038,003 | 8/1991 | Allec et al. | 174/138 F X |
| 5,316,789 | 5/1994 | Ookuma et al. | 427/117 |
| 5,354,210 | 10/1994 | Koblitz et al. | 439/276 X |
| 5,520,974 | 5/1996 | Chiotis et al. | 428/35.7 X |

FOREIGN PATENT DOCUMENTS

| | | | |
|---|---|---|---|
| 1433716 | 2/1966 | France | 174/76 |

*Primary Examiner*—Dean A. Reichard
*Assistant Examiner*—Chau N. Nguyen
*Attorney, Agent, or Firm*—Greenblum & Bernstein, P.L.C.

[57] ABSTRACT

A protective construction for a splice porion of several wires includes a transparent or semi-transparent cap made of resin with a mouth and a bottom end. The cap is filled with a transparent or semi-transparent hot melt. Exposed conductors in the spliced portion of the wires are welded and inserted into the hot melt such that the hot melt reaches the mouth of the cap. The transparent or semi-transparent nature of the cap and hot melt permits visual inspection of the wires in the cap.

9 Claims, 1 Drawing Sheet

PROTECTIVE CONSTRUCTION FOR SPLICE PORTION

BACKGROUND OF THE INVENTION

The present invention generally relates to protective constructions for a splice portion in which conductors of a plurality of wires exposed by removing insulating coatings from end portions of the wires are connected to each other and more particularly, to a high-quality and high-performance protective construction for the splice portion, which can be produced at low cost.

As shown in FIG. 3, a protective construction for a splice portion is known from, for example, Japanese Utility Model Laid-Open Publication No. 55-17231 (1980). In FIG. 3, conductors 2 are exposed by removing insulating coatings from end portions of a plurality of wires 1 and are connected to each other by contact bonding by a connector 3 so as to form a splice portion A. Subsequently, the splice portion A is inserted into a sacklike cap 5 made of elastomer and then, an insulating tape 6 made of vinyl chloride is wound around the cap 5 and the wires 1 so as to secure the cap 5 to the wires 1.

However, in order to prevent the exposed conductors 2 from piercing through the cap 5 made of synthetic resin when the splice portion A of the wires 1 has been inserted into the cap 5 in the known protective construction for the splice portion A, wall thickness t of the cap 5 should be increased or the cap 5 should be made of wear-resistant synthetic resin, thereby resulting in rise of production cost of the known protective construction.

Meanwhile, since the insulating tape 6 is required to be wound around the cap 5 and the wires 1, production cost of the known protective construction rises. In addition, during winding of the insulating tape 6 around the cap 5 and the wires 1, relative position of the cap 5 and the wires 1 may be shifted or the cap 5 may be detached from the wires 1 due to defective winding of the insulating tape 6 around the cap 5 and the wires 1 and thus, quality of the known protective construction becomes unstable.

Furthermore, since the cap 5 is fixed to the wires 5 by merely winding the insulating tape 6 around the cap 5 and the wires 1, holding force for holding the cap 5 and the wires 1 together is small. In addition, since gap exists between the splice portion A and the cap 5, the splice portion A may be damaged when an external force is applied to the cap 5.

Moreover, since a mouth of the cap 5 is closed by only the insulating tape 6 and the gap exists between the splice portion A and the cap 5, the splice portion A is likely to be subjected to corrosion due to penetration of water into the splice portion A or damage due to salt content. Especially, in case the splice portion A is disposed in a high-temperature environment such as an engine room of a motor vehicle, water is readily collected in the splice portion A through dropwise condensation due to sharp changes of temperature and thus, the splice portion A is more apt be subjected to corrosion.

SUMMARY OF THE INVENTION

Accordingly, an essential object of the present invention is to provide, with a view to eliminating the above mentioned drawbacks of conventional protective constructions, a high-quality and high-performance protective construction for a splice portion, which can be produced at low cost.

In order to accomplish this object of the present invention, a protective construction for a splice portion of a plurality of wires, comprising: the splice portion in which conductors exposed at end portions of the wires, respectively are welded to each other by ultrasonic welding or resistance welding; a cylindrical cap which is made of resin and has a mouth and a bottom formed at its opposite ends, respectively; and hot melt which is poured into the cap so as to be filled to vicinity of the mouth of the cap when the splice portion has been inserted into the cap.

In the protective construction of the present invention, since the splice portion is inserted into the resinous cylindrical cap having the bottom end such that the hot melt is filled to the vicinity of the mouth of the cap, holding force for holding the splice portion in the cap is large. Therefore, even if an external force is applied to the cap, the splice portion is not damaged.

Meanwhile, since the hot melt penetrates into also gaps among the wires, water neither enters the cap nor is collected in the cap through dropwise condensation of water content. Therefore, since the conductors are not subjected to corrosion or damage due to salt content, performance of the protective construction is improved.

Furthermore, since the splice portion is molded by the hot melt concurrently with insertion of the splice portion into the cap, the splice portion is least likely to pierce through the cap. As a result, wall thickness of the cap can be lessened and the cap is not required to be made of wear-resistant synthetic resin, thereby resulting in reduction of production cost of the cap, i.e., the protective construction.

If the splice portion of the wires is inserted into the cap after the hot melt has been poured into the cap, the hot melt is rapidly cooled through heat dissipation of the exposed conductors so as to be hardened. Hence, hitherto necessary operation for winding a tape around the cap and the wires is not required to be performed, thus resulting in drop of production cost of the protective construction. In addition, since relative position of the cap and the wires is not shifted and the cap is not detached from the wires due to improper winding of the tape around the cap and the wires, performance of the protective construction is improved.

For example, the cap is made of vinyl chloride and the hot melt is made of dimer acid series polyamide. In this case, since the hot melt has excellent bonding property relative to the cap, the holding force for holding the cap and the wires together is increased.

It is preferable that the cap and the hot melt are transparent or semitransparent. In this case, it is possible to visually inspect easily whether or not the splice portion of the wires is inserted into the cap properly.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 1:
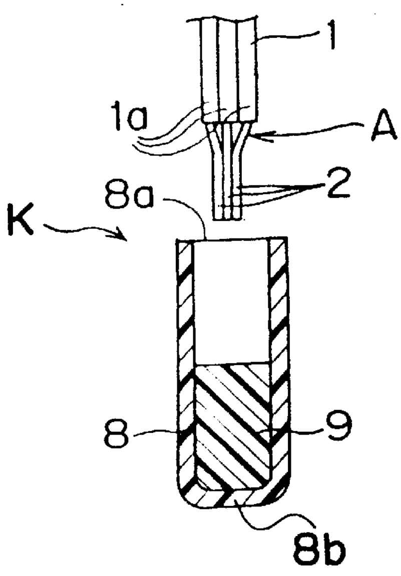
FIG. 1 is a sectional view of a protective construction for a splice portion, according to one embodiment of the present invention prior to insertion of the splice portion into a cap.
Figure 2:
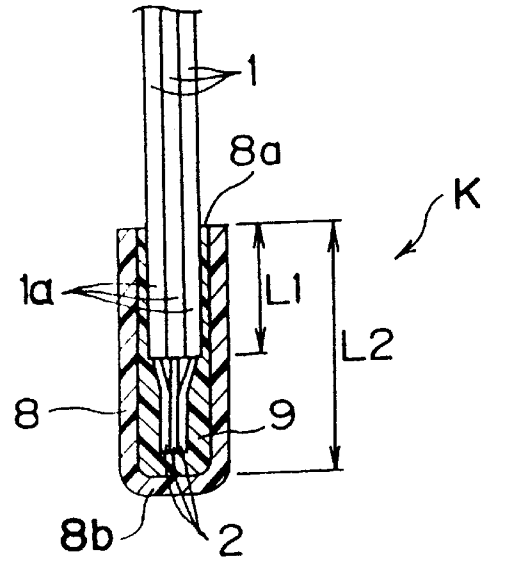
FIG. 2 is a sectional view of the protective construction of FIG. 1 after insertion of the splice portion into the cap.
Figure 3:
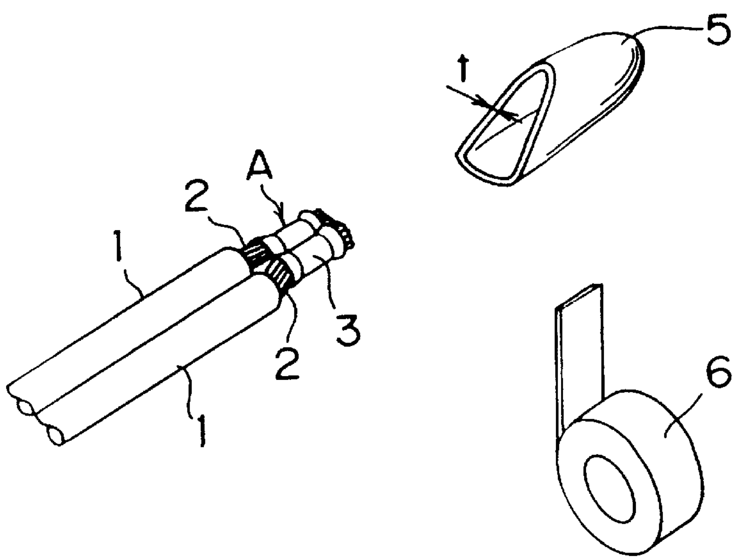
Fig. 3 PRIOR ART
FIG. 3 is a perspective view of a prior art protective construction for a splice portion (already referred to).

FIGS. 1 and 2 show a protective construction K for a splice portion A, according to one embodiment of the present invention. The wiring construction K includes a cylindrical cap 8 made of at least partially transparent (i.e., transparent or semitransparent) vinyl chloride and having a mouth 8*a* and a bottom 8*b* formed at its opposite end portions, respectively. The splice portion A is inserted into the cap 8 such that hot melt 9 is filled to vicinity of the mouth 8*a* of the cap 8.

In order to produce the protective construction K for the splice portion A, conductors 2 are initially exposed by removing insulating coatings 1*a* from end portions of a plurality of wires 1 as shown in FIG. 1 and the exposed conductors 2 of the wires 1 are subjected to ultrasonic welding so as to form the splice portion A.

Subsequently, the hot melt 9 in molten state is poured into the cap 8. The cap 8 can be easily produced by dipping. As shown in FIG. 2, a length L2 of the cap 8 is set such that the exposed conductors 2 of the splice portion A and the insulating coatings 1*a* having a length L1 substantially equal to a length of the exposed conductors 2 of the splice portion A can be inserted into the cap 8.

When the hot melt 9 is poured into the cap 8, the cap 8 is set vertically as shown in FIG. 1 so as to be mounted on an automatic hot melt dispenser (not shown). A predetermined amount of the hot melt 9 of molten transparent or semi-transparent dimer acid series polyamide is poured into the cap 8 from the mouth 8*a* by the automatic hot melt dispenser. Amount of the hot melt 9 to be poured into the cap 8 is set such that the hot melt 9 is filled to vicinity of the mouth 8*a* of the cap 8 when the splice portion A and the insulating coatings 1*a* abutting on the splice portion A have been inserted into the cap 8 as will be described later.

It is preferable that "Macromelt 4T-378" (brand name) produced by Henkel Hakusui Co., Ltd is used as the hot melt 9 and Table 1 below shows data on its properties. In Table 1, the term "Low bending temperature" at the bottom row indicates a minimum temperature at which no crack is found in a test piece of 1 mm in thickness, 10 mm in width and 50 mm in length when the test piece is flexed by a flexing machine.

TABLE 1

| | | |
|---|---|---|
| Viscosity | at 170° C. | 40 |
| (Poise) | at 180° C. | 27 |
| | at 190° C. | 20 |
| | at 200° C. | 15 |
| | at 210° C. | 11 |
| Softening point (° C.) | 160 | |
| Peel strength (N/mm) PVC/PVC | | 1.5 |
| Tensile strength ($N/mm^{2)}$ | [Yield value] | 2.5 |
| | [Fracture value] | 2.5 |
| Elongation (%) | | 70 |
| Low bending temperature (° C.) | | −35 |

After the hot melt 9 has been poured into the cap 8 as described above, the splice portion A and the insulating coatings 1*a* abutting on the splice portion A are inserted into the cap 8 as shown in FIG. 2 while the hot melt 9 is in molten state. At this time, a distal end of the splice portion A is brought out of contact with the bottom 8*b* of the cap 8. When the splice portion A of the wires 1 have been inserted into the cap 8 as described above, heat of the hot melt 9 is dissipated through splice portion A and the wires 1 and thus, the hot melt 9 is rapidly cooled so as to be hardened. Therefore, even if the cap 8 tilts immediately after insertion of the splice portion A into the cap 8, there is no risk that the hot melt 9 flows out of the cap 8.

In this embodiment, since the cap 8 and the hot melt 9 are transparent or semitransparent, it is possible to easily visually inspect whether or not the splice portion A is inserted into the cap 8 properly. Meanwhile, if the exposed conductors 2 are brought into contact with the bottom 8*b* of the cap 8 at the time of insertion of the splice portion A into the cap 8, the splice portion A can be inserted into the cap 8 efficiently but the exposed conductors 2 may pierce through the cap 8 undesirably. On the other hand, if the exposed conductors 2 are brought out of contact with the bottom 8*b* of the cap 8 as in this embodiment, efficiency for inserting the splice portion A into the cap 8 deteriorates but there is no risk that the exposed conductor 2 pierce through the cap 8. However, if the exposed conductors 2 are brought into contact with the bottom 8*b* of the cap 8 lightly, the exposed conductors 2 are least likely to pierce through the cap 8. Therefore, the exposed conductors 2 may be brought into contact with the bottom 8*b* of the cap 8 lightly.

In the above mentioned protective construction K for the splice portion A, since the splice portion A and the wires 1 are molded by the hot melt 9 concurrently with insertion of the splice portion A and the wires 1 into the cap 8, possibility that the exposed conductors 2 pierce through the cap 8 is lessened. Therefore, not only wall thickness of the cap 8 can be reduced but the cap 8 is not required to be made of wear-resistant synthetic resin, thus resulting in drop of production cost of the cap 8. Meanwhile, since the protective construction K can be formed by inserting the splice portion A of the wires A into the cap 8 after the predetermined amount of the hot melt 9 has been poured into the cap 8 from the automatic hot melt dispenser, hitherto necessary operation for winding a tape around the splice portion A and the wires 1 is not required to be performed, thereby resulting in reduction of production cost of the protective construction K for the splice portion A.

Meanwhile, in the protective construction K of the present invention, since not only the hot melt 9 is present between the splice portion A and the cap 8 but the cap 8 made of vinyl chloride and the insulating coatings 1*a* of the wires 1, which are made of vinyl chloride, are bonded to each other by the hot melt 9 made of dimer acid series polyamide having excellent bonding properties relative to vinyl chloride, holding force for holding the cap 8 and the wires 1 together is large. Accordingly, even when an external force is applied to the cap 8, damage to the splice portion A can be prevented.

Meanwhile, since the hot melt 9 penetrates into not only a gap between the splice portion A and the cap 8 but gaps among the wires 1, water neither enters the cap 8 nor is collected in the cap 8 through dropwise condensation of water content. As a result, since the conductors 2 are not subjected to corrosion or damage due to salt content, performance of the protective construction K is improved. Especially, in this embodiment, since dimer acid series polyamide of low viscosity is used as the hot melt 9, the hot melt 9 can penetrate into the gap between the splice portion A and the cap 8 and the gaps among the wires 1 sufficiently.

Furthermore, since the splice portion A is molded by rapid cooling of the hot melt 9 as described above, relative position of the cap 8 and the wires 1 is not shifted. In addition, since such an undesirable phenomenon associated with a prior art protective construction that the cap 8 is detached from the wires 1 due to defective winding of the tape does not happen. Accordingly, the protective construction K for the splice portion A, according to the present invention has high quality and high performance and can be produced at low cost.

Moreover, since the cap 8 and the hot melt 9 are transparent or semitransparent, it is possible to visually inspect easily from outside of cap 8 whether or not the splice portion A of the wires 1 is inserted into the cap 8 properly.

Meanwhile, the present invention is not restricted to the above described embodiment but can be modified variously. For example, in this embodiment, the cap 8 is made of vinyl chloride and the hot melt 9 is made of dimer acid series polyamide but the cap 8 and the hot melt 9 may also be made of other materials. In addition, the cap 8 and the hot melt 9 may not be necessarily transparent or semitransparent. Meanwhile, in this embodiment, the conductors 2 disposed at the distal end of each of the wires 1 are welded to each other by ultrasonic welding but may also be welded to each other by resistance welding so as to form the splice portion A.

In order to study characteristics of the protective construction K for the splice portion A, experiments on holding force, piercing force and tearing force of the protective construction K of the present invention and a prior art protective construction as a comparative example have been conducted as described below. In the protective construction K of the present invention, the cap 8 is made of vinyl chloride and the hot melt 9 is made of dimer acid series polyamide. On the other hand, in the prior art protective construction, a splice portion is inserted into a cap made of elastomer and then, an insulating tape made of polyvinyl chloride is wound around the cap and wires.

The holding force for holding the cap 8 and the wires 1 together is a peak load measured at the time the wires 1 are pulled out of the fixed cap 8. Meanwhile, the piercing force is a peak load measured at the time the wires 1 depressed against the fixed cap 8 pierce through the cap 8. Furthermore, supposing that each of the conductors 2 has a cross-sectional area of 0.5 $mm^2$ and the wires 1 projecting out of the cap 8 are divided into two sets, the tearing force is a load measured at the time the splice portion A is damaged when the two sets of the wires 1 are pulled in opposite directions, respectively. Experimental results of the protective construction K of the present invention and the prior art protective construction are shown below in Tables 2 and 3, respectively.

TABLE 2

| | |
|---|---|
| Holding force | 98 N |
| Piercing force | No piercing happens |
| Tearing force | 117.6 N |

TABLE 3

| | |
|---|---|
| Holding force | 12.25 N |
| Piercing force | 117.6 N |
| Tearing force | 40 N |

As is apparent from Tables 2 and 3, the holding force of the protective construction K of the present invention is so large as about eight times that of the prior art protective construction. Meanwhile, in the prior art protective construction, the wires pierce through the cap at a piercing force of 117.6 N. On the other hand, the wires 1 do not pierce through the cap 8 and thus, can be depressed against the cap 8 until the wires 1 buckle. Furthermore, the tearing force of the protective construction K is about three times that of the prior art protective construction and thus, the protective construction K of the present invention is quite resistant against tearing.

In the protective construction for the splice portion according to the present invention, the splice portion is inserted into the resinous cylindrical cap having the bottom formed at its one end such that the hot melt is filled to the vicinity of the mouth of the cap. Therefore, even if an external force is applied to the cap, the splice portion is not damaged and the holding force for holding the splice portion in the cap is increased greatly.

Meanwhile, since the hot melt penetrates also into the gaps among the wires, water neither enters the cap nor is collected in the cap through dropwise condensation of water content. Therefore, since the conductors of the wires are not subjected to corrosion or damage due to salt content, performance of the protective construction is improved.

Furthermore, since the splice portion is molded by the hot melt concurrently with insertion of the splice portion into the cap, the splice portion is least likely to pierce through the cap. As a result, wall thickness of the cap can be lessened and the cap is not required to be made of wear-resistant synthetic resin, thereby resulting in reduction of production cost of the cap, i.e., the protective construction.

Moreover, if the splice portion of the wires is inserted into the cap after the hot melt has been poured into the cap, the hot melt is rapidly cooled by heat dissipation of the exposed conductors so as to be hardened. Accordingly, since hitherto necessary operation for winding the tape around the cap and the wires is not required to be performed, production cost of the protective construction is lowered. In addition, since relative position of the cap and the wires is not shifted and the cap is not detached from the wires due to defective winding of the tape around the cap and the wires, performance of the protective construction is stabilized.

In case the cap is made of vinyl chloride and the hot melt is made of dimer acid series polyamide, the hot melt has excellent bonding properties relative to the cap. Thus, the holding force for holding the wires in the cap can be further improved.

Furthermore, if the cap and the hot melt are made transparent or semitransparent, it is possible to visually inspect easily from outside of the cap whether or not the splice portion of the wires has been inserted into the cap properly. Accordingly, operation for inserting the splice portion into the cap can be performed easily and it is possible to easily find out defective insertion of the splice portion into the cap.

What is claimed is:

1. A protective construction for spliced portions of a plurality of wires, comprising:

an at least partially transparent cap for enclosing said portions; and at least a portion of said cap being filled with at least partially transparent hot melt;

wherein an object placed in said hot melt is visible through said cap and hot melt, and wherein said object does not contact an inner periphery of said cap.

2. The protective construction of claim 1, wherein said spliced portions of said plurality of wires are disposed in said hot melt such that a state of said spliced portions can be ascertained visually through said cap and hot melt.

3. The protective construction of claim 2, wherein said hot melt forms a waterproof seal around said spliced portions of said plurality of wires.

4. The protective construction of claim 2, wherein said hot melt fills gaps between said spliced portions of said plurality of wires.

5. The protective construction of claim 2, wherein said hot melt fills said cap.

6. The protective construction of claim 2, wherein said spliced portions of said plurality of wires do not directly contact an inner periphery of said cap.

7. The protective construction of claim 1, wherein said cap is made from vinyl chloride.

8. The protective construction of claim 1, wherein said hot melt is made from dimer acid series polyamide.

9. A protective construction for spliced portions of a plurality of wires, comprising:

an at least partially transparent cap;

said spliced portions being disposed inside said cap without contacting an inner periphery of said cap;

said cap being filled with an at least partially transparent hot melt disposed about and among said spliced portions, said hot melt leveling off in proximity to a mouth of said cap;

a state of said spliced portion being visible through said cap and said hot melt; and said hot melt forming a watertight seal around said spliced portions.

* * * * *

UNITED STATES PATENT AND TRADEMARK OFFICE

CERTIFICATE OF CORRECTION

PATENT NO. : 6,156,976
DATED : December 5, 2000
INVENTOR(S) : S. Kawamura et al.

It is certified that error appears in the above-identified patent and that said Letters Patent is hereby corrected as shown below:

Title page,
Item [56], References Cited, the following FOREIGN PATENT DOCUMENT was omitted and should be included:
-- 5517231 2/1980 Japan --.

Signed and Sealed this

Twelfth Day of February, 2002

*Attest:*

JAMES E. ROGAN
*Director of the United States Patent and Trademark Office*

*Attesting Officer*